F. SCHIMPER.
YEAST WASHING AND AERATING APPARATUS.
APPLICATION FILED OCT. 12, 1911.
1,020,716. Patented Mar. 19, 1912.
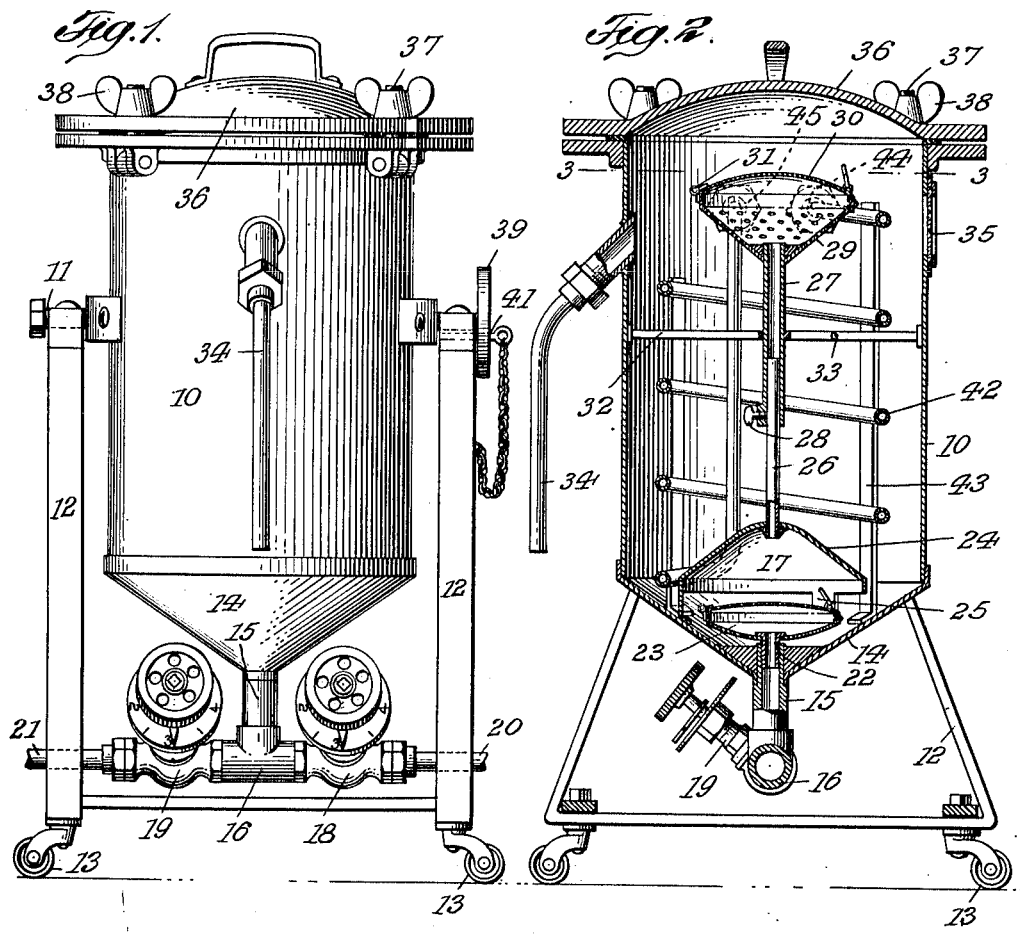
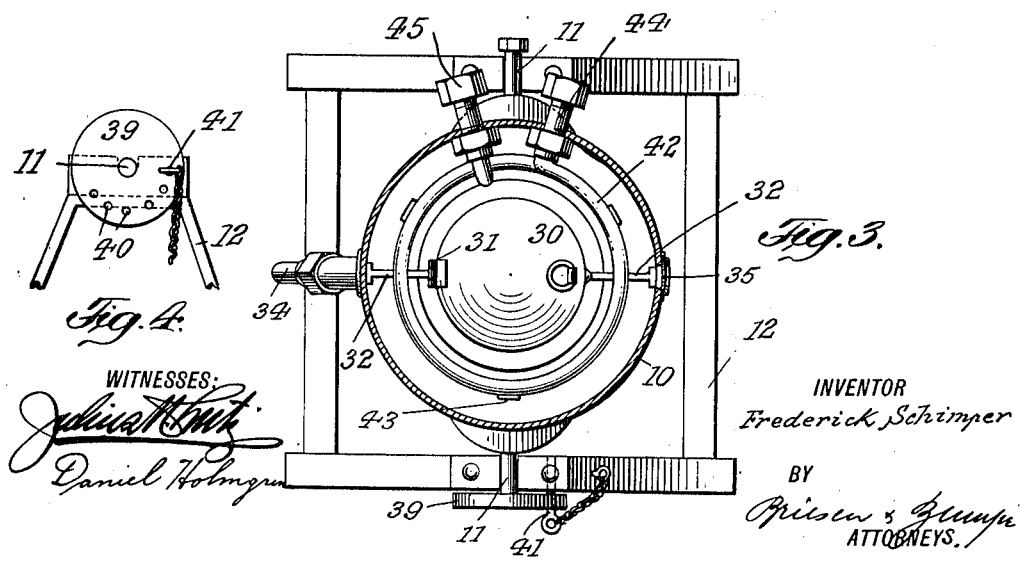
WITNESSES:
INVENTOR
Frederick Schimper
BY
ATTORNEYS.

UNITED STATES PATENT OFFICE.

FREDERICK SCHIMPER, OF UNION, NEW JERSEY, ASSIGNOR OF ONE-HALF TO ALFRED H. KOELLER, OF RIDGEFIELD PARK, NEW JERSEY.

YEAST WASHING AND AERATING APPARATUS.

1,020,716.  Specification of Letters Patent.  Patented Mar. 19, 1912.

Application filed October 12, 1911. Serial No. 654,355.

*To all whom it may concern:*

Be it known that I, FREDERICK SCHIMPER, a citizen of the United States, residing in the town of Union, county of Hudson, and State of New Jersey, have invented a new and Improved Yeast Washing and Aerating Apparatus, of which the following is a specification.

This invention relates to an apparatus of novel construction for efficiently washing and aerating yeast and for separating therefrom the dead cells and other impurities in a quick and thorough manner.

In the accompanying drawing: Figure 1 is a side elevation of a yeast washer and aerator embodying my invention; Fig. 2 a vertical central section thereof; Fig. 3 a horizontal section on line 3—3, Fig. 2, and Fig. 4 a detail.

A cylindrical vessel 10 is by gudgeons 11 suspended from a frame 12, which is preferably movable and is shown to be mounted on casters 13. Vessel 10 has a conical bottom 14, into which opens a pipe 15 which by a T coupling 16 and a pair of valves 18, 19, is connected to two pipes 20, 21 leading respectively to a source of purified water and a source of filtered air. Into the mouth of pipe 15 is fitted the nipple 22 of a hollow mixing head 23, adapted to receive the aerated water from pipe 15 and to discharge the same through its hinged upper foraminated side into the lower part of vessel 10. Above head 23, there is mounted within the vessel a belled shield or false bottom 24 forming a lower chamber 17 which is open at the bottom. Shield 24 is supported by a number of feet 25 which are of such a length as to form a substantial clearance between the lower edge of the shield and the upper side of bottom 14. Into the center of shield 24 enters a stand pipe 26 extending axially through vessel 10, and provided with an upper telescoping section 27, having clamp screw 28, so that the combined length of the pipes 26, 27 is regulable. At its upper end pipe 27 carries a rose or similar multiple discharge device 29 through which the contents of the pipe are released into the upper part of vessel 10. Rose 29 is provided with a lid 30 hinged as at 31 and adapted to be opened whenever the device is to be cleaned. To pipe 27 are secured a pair of braces 32, one of which is articulated as at 33, said braces bearing against opposite sides of vessel 10 and serving to firmly sustain the shield 24 together with pipes 26, 27 and rose 29 in position, while at the same time permitting their ready removal.

Vessel 10 is provided with an upper overflow pipe 34 through which the water carrying the dead cells and other lighter impurities are adapted to be discharged. The vessel is also provided with a spy glass 35 and with a cover 36 which may be locked down by swivel bolts 37 carrying winged nuts 38.

In order to sustain the vessels at various inclinations, there is mounted on one of its gudgeons 11, a disk 39 having a series of peripheral apertures 40. These apertures are adapted to be engaged by a cutter pin 41, that is likewise adapted to engage an aperture in frame 12. Thus after the vessel is tilted to the angle desired, it may be locked in position by passing pin 41 through the proper aperture of disk 39 as well as through the frame-aperture, as will be readily understood.

Means are provided for keeping the washed and aerated yeast in good condition within the vessel for a considerable length of time. These means consist of a pipe coil 42 arranged within vessel 10 and mounted upon a frame 43 that is removably supported on bottom 14. This coil is adapted to receive brine or other cooling medium at one end through a connection 44, extending through the wall of vessel 10, and to discharge the same at the other end through a similar connection 45.

The yeast is washed and aerated in the following manner: After the apparatus has been charged with the yeast which is to be treated, pure water is admitted through valve 18, while at the same time the cover 36 of the apparatus remains off. When enough water has been admitted to insure the proper consistency of the yeast, the air valve 19 is opened, while at the same time a slow but steady stream of water is maintained. The air forces the yeast at the bottom of the apparatus into the lower chamber 17 from where it will rise (mixed with water and air) through the pipes 26, 27 in the center and pass back into the apparatus through the upper sieve 29. The heavy and vigorous yeast will at once sink to the bottom, while the dead yeast and any small and light cells, as well as bacteria and other light impurities will be carried off with the waste water through the overflow pipe 34. In this manner a complete purification of the yeast is obtained, and the washing process is continued until the water in the spy glass appears to be fairly pure. The air supply must be so regulated that the water does not carry off too much of the yeast, a condition of affairs which can readily be noted at the spy-glass. As soon as the yeast is of the desired degree of purity, the air and water supplies are shut off and the yeast may then be immediately employed for pitching. If it should be necessary to keep the yeast for some length of time, the cover of the apparatus is screwed on after the yeast has been properly washed, and cold water or brine is circulated through the cooling coil 42 in order to keep the yeast at a temperature as near the freezing point as possible.

If the yeast is to be propagated before it is used for pitching, it should be allowed to settle somewhat, the supernatent water is allowed to run off through the waste pipe, and the necessary quantity of wort is added. The air valve is opened slightly until the yeast commences to rise; then the cover may be screwed on and the entire contents of the vessel transferred to the pitching vat by means of air pressure.

The manipulation of the apparatus is a very simple one and requires very little time and labor; tests so far made with the apparatus in breweries have demonstrated that an absolutely pure and vigorous yeast will be obtained.

I claim:

1. A device of the character described, comprising a vessel, a cock-controlled water pipe and a cock-controlled air pipe entering the lower end thereof, a shield within the vessel, arranged at a distance above the ingress opening of said pipes, a stand pipe extending upwardly from said shield, and a rose at the upper end of said stand pipe.

2. A device of the character described, comprising a vessel, means for admitting water and air to the lower part thereof, a belled shield within the vessel that forms a lower chamber above the ingress opening of the water and air, a pipe extending upwardly from the shield and communicating with said lower chamber, and a plurality of discharge orifices communicating with the upper end of the pipe.

3. A device of the character described, comprising a vessel, means for admitting water and air to the lower part thereof, a foraminated mixing head within the vessel adapted to receive said water and air, a belled shield forming a lower chamber within the vessel above the mixing head, a pipe extending upwardly from the shield and communicating with said lower chamber, and a plurality of discharge orifices communicating with the upper end of the pipe.

4. A device of the character described, comprising a vessel, an inlet pipe for water and air entering the bottom thereof, a foraminated mixing head within the vessel that communicates with said pipe, a chamber above said mixing head, a stand pipe that communicates with said chamber, and a rose carried by the upper end of said stand pipe.

5. A device of the character described, comprising a vessel, an inlet pipe for water and air entering the bottom thereof, a foraminated mixing head within the vessel that communicates with said pipe, a chamber above said mixing head, a stand pipe that communicates with said chamber, a rose carried by the upper end of said last named pipe, and an overflow pipe that leads from the upper part of the vessel.

6. A device of the character described, comprising a vessel, an inlet pipe for water and air entering the bottom thereof, a foraminated mixing head within the vessel that communicates with said pipe, a chamber above said mixing head, a stand pipe that communicates with said chamber, a rose carried by the upper end of said last named pipe, an overflow pipe that leads from the upper part of the vessel, and a cooling coil within the vessel.

7. A device of the character described, comprising a frame, a vessel suspended therefrom, means for locking said vessel to said frame at different inclinations, a water and air inlet at the bottom of the vessel, a chamber formed within the vessel above said inlet, a stand pipe within the vessel that communicates with said chamber, a plurality of discharge orifices communicating with the upper end of said stand pipe, and an overflow at the upper end of the vessel.

FREDERICK SCHIMPER.

Witnesses:
FRANK V. BRIESEN,
KATHERYNE KOCH.